United States Patent [19]
Rosinski et al.

[11] Patent Number: 4,552,648
[45] Date of Patent: Nov. 12, 1985

[54] FLUIDIZED CATALYTIC CRACKING PROCESS

[75] Inventors: Edward J. Rosinski, Pedricktown, N.J.; Albert B. Schwartz, Philadelphia; Francis G. Dwyer, West Chester, both of Pa.

[73] Assignee: Mobil Oil Corporation, New York, N.Y.

[21] Appl. No.: 577,941

[22] Filed: Feb. 8, 1984

[51] Int. Cl.$^4$ .............................................. C10G 11/05
[52] U.S. Cl. ................................... 208/120; 208/111
[58] Field of Search ............................................. 208/120

[56] References Cited

U.S. PATENT DOCUMENTS

| | | | |
|---|---|---|---|
| 3,442,795 | 5/1969 | Kerr et al. | 208/120 |
| 3,966,586 | 6/1976 | Owen et al. | 208/120 |
| 3,974,062 | 8/1976 | Owen et al. | 208/74 |
| 4,002,557 | 1/1977 | Owen et al. | 208/120 |
| 4,016,218 | 4/1977 | Haag et al. | 260/671 R |
| 4,104,151 | 8/1978 | Rubin et al. | 208/111 |
| 4,105,541 | 8/1978 | Plank et al. | 208/111 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,340,465 | 7/1982 | Miller et al. | 208/120 |
| 4,402,866 | 9/1983 | Shihabi | 208/120 |

*Primary Examiner*—D. E. Gantz
*Assistant Examiner*—O. Chaudhuri
*Attorney, Agent, or Firm*—Alexander J. McKillop; Michael G. Gilman; Marina V. Schneller

[57] ABSTRACT

A process for catalytically cracking a hydrocarbon feed in a reaction zone under catalytic cracking conditions in the absence of added hydrogen with a catalyst comprising a conventional cracking catalyst. The improvement comprises adding to the conventional cracking catalyst a thermally treated zeolite having a mole ratio of $SiO_2$:$Al_2O_3$ of about 10:1 to 100:1 and a constraint index of about 1 to 12. Thermal treatment reduces the additive zeolite's alpha activity to about 1 to 10 prior to use.

25 Claims, No Drawings

FLUIDIZED CATALYTIC CRACKING PROCESS

BACKGROUND OF THE INVENTION

1. Field of the Invention

This invention relates to a fluidized catalytic cracking process in the presence of a conventional catalyst and a zeolite which has been given a thermal treatment prior to use.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 zeolite to large pore size crystalline zeolite was in the range of 1:10 to 3:1.

The use of ZSM-5 in conjunction with a zeolite cracking catalyst of the X or Y faujasite variety is described in U.S. Pat. Nos. 3,894,931; 3,894,933; and 3,894,934. The two former patents disclose the use of ZSM-5 in amounts up to and about 5 to 10 weight percent; the latter patent discloses the weight ratio of ZSM-5 to large pore size crystalline zeolite in the range of 1:10 to 3:1.

The addition of very small amounts of pure, finely divided shape selective catalyst to a conventional FCC catalyst, was taught in U.S. Pat. No. 4,309,280, the entire contents of which are incorporated herein by reference. This patent taught the advantage of using, as the powdered additive catalyst, a ZSM-5 zeolite with very high silica-alumina ratios. Use of a 1500 to 1 $SiO_2/Al_2O_3$ mole ratio ZSM-5 catalyst in conjunction with a fluid cracking process was disclosed in Example 8 and Example 13. Use of ZSM-5 with an even higher ratio was disclosed in Example 9, which added ZSM-5 containing only 15 ppm $Al_2O_3$. The patentees commented that the preferred additives, shape selective zeolites such as ZSM-5, were very active even with high silica to alumina mole ratios. This activity was considered surprising, since catalytic activity of zeolites is generally attributed to cations associated with framework aluminum atoms.

U.S. Pat. No. 4,309,279, the entire contents of which are incorporated herein by reference, disclosed the addition of very small amounts of a special class of zeolites characterized by a silica to alumina mole ratio greater than 12 and a constraint index of about 1 to 12, to conventional cracking catalyst. The patentees included a teaching, but no examples, to addition of shape selective zeolites, e.g., ZSM-5, with very high silica to alumina mole ratios, up to 30,000 and greater.

In U.S. Pat. No. 4,340,465, the entire contents of which are incorporated herein by reference, the patentees taught use of ZSM-5 with very high silica to alumina mole ratios for catalytic cracking. The examples in this patent show that as the silica to alumina mole ratio increased, the activity of the catalyst, as measured by the weight percent conversion, decreased. In going from a sieve containing 2.3 weight percent Al, to 0.45 to 0.04 wt %, the weight percent conversion declined from 34 to 12 to 7, respectively. This indicated a significant loss in cracking activity when using ZSM-5 with a relatively low aluminum content.

Some work has been done on removal of alumina from relatively small pore zeolites such as mordenite. In U.K. patent specification No. 1,151,653, the patentees disclosed that the hydrogen form of a zeolite was preferred for many hydrocarbon conversion processes, and taught a combination treatment of the zeolite with acid and an ammonium compound to achieve the desired hydrogen form. The treatment included boiling with acid, which would extract some aluminum.

U.K. patent specification No. 1,261,616 taught a method of making acid extracted mordenite.

Some work has also been reported on preparation of aluminum deficient faujasites in "Chemistry of Crystalline Aluminosilicates", G. T. Kerr, *the Journal of Physical Chemistry*, Vol. 72, 1968, pages 2594–2596 and in U.S. Pat. No. 3,442,795. The entire contents of these references are incorporated herein by reference. Aluminum was removed directly from sodium zeolite Y, using ethylenediaminetetraacetic acid, EDTA. This reference taught that as most of the Al was removed from the NaY the crystallinity of the material changed, and indeed was lost when less than 20 percent of the original aluminum framework content remained. This reference reported increased sorptive capacity, based on the number of grams of $SiO_2$ in the samples, up to about 70 percent aluminum removal, after which sorptive capacity decreased.

The art has recognized the desirability of adding ZSM-5 material, preferably with a low aluminum content in the ZSM-5 framework, to conventional FCC catalyst. Most of the art's efforts at achieving low aluminum content have been directed towards either producing a material with a very low aluminum content, by, e.g., making ZSM-5 material with a silica sol that contained only a very small amount of aluminum. Another way of achieving this low aluminum content is to use conventional aluminum extraction methods, such as treating the ZSM-5 with a strong mineral acid or a chelating agent such as ethylenediaminetetraacetic acid.

It is also known that the alpha activity of ZSM-5 catalyst can be modified by thermal treatment. In U.S. Pat. No. 4,016,218, the entire contents of which are incorporated herein by reference, a process for the alkylation of aromatic hydrocarbons using thermally treated ZSM-5 catalyst is disclosed. Thermal treatment is used to reduce the alpha activity to less than 250, and preferably less than about 200 but greater than 10.

We have discovered that it is possible to achieve the benefits of adding low alumina shape selective material, e.g., ZSM-5, to a conventional FCC process, without the expense and inconvenience of making a zeolite with an inherently low alumina content, or acid extracting a conventional zeolite.

We can take ZSM-5 with, e.g., 40-90 silica to alumina mole ratio, and convert this into material that acts in the FCC process as if it had a relatively low aluminum content equivalent to a 500:1 to 1500:1 silica to alumina ratio.

We learned that a thermal treatment of conventional ZSM-5 could significantly alter the characteristics of this shape selective catalyst so that it responded in the FCC process, as a shape selective catalyst that had been made by a special manufacturing techniques, or acid extracted, to contain a relatively low aluminum content.

The process that we use to alter the catalytic activity of the shape selective material is a simple one—steaming or other thermal treatment. The simplicity and efficacy of steaming to achieve these results is surprising because the art has been steaming FCC catalysts for years without recognizing the benefits that could be obtained by controlled steaming of these shape selective materials.

BRIEF SUMMARY OF THE INVENTION

Accordingly the present invention provides a process for catalytically cracking a hydrocarbon feed comprising the steps of contacting the feed in a reaction zone under catalytic cracking conditions in the absence of added hydrogen with a catalyst comprising a conventional cracking catalyst to produce a cracked hydrocarbon product which is recovered as a product of the process, the improvement comprising adding to said conventional cracking catalyst a thermally treated zeolite having a mole ratio of $SiO_2:Al_2O_3$ of about 10:1 to 100:1 and a constraint index of about 1 to 12, wherein said zeolite has been subjected to thermal treatment at thermal treatment conditions sufficient to reduce its alpha value below 10 prior to use in said process.

In a more limited embodiment, the present invention provides a process for catalytically cracking a hydrocarbon in a fluidized catalytic cracking process using a large pore size crystalline aluminosilicate containing cracking catalyst under catalytic cracking conditions including a total residence time in said reaction zone of less than about 10 seconds, the improvement comprising adding to said catlyst a thermally treated zeolite component having a mole ratio of $SiO_2:Al_2O_3$ of about 10:1 to about 100:1 and a constraint index of about 1 to 12 wherein said zeolite has been subjected to thermal treatment to reduce its alpha value below 10.

DETAILED DESCRIPTION

Conventional Cranking Process

Any conventional cracking, preferably a fluidized catalytic cracking or FCC, process and catalyst for use therein can be used in the present invention. Catalytic cracking units which are amenable to the process of this invention operate within the temperature range of about 150° to 750° C. and under reduced atmospheric or superatmospheric pressure. The catalytic cracking process may be operated batchwise but preferably operated continuously. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

A recent advance in the art of catalytic cracking is disclosed in U.S. Pat. No. 4,072,600, the entire contents of which are incorporated herein by reference. One embodiment of this patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the conventional cracking catalyst can vary from between about 0.1 ppm and about 100 ppm based on total catalyst inventory. The aforesaid metals can also be introduced into the process with or as part of the zeolite in amounts such that the overall content of such metal based on total catalyst in the cracking unit is within the aforenoted range.

After cracking, the resulting product gas may be compressed and the resulting products may suitably be separated from the remaining components by conventional means such as adsorption, distillation, etc.

Hydrocarbon charge stocks undergoing cracking in accordance with this invention comprise hydrocarbons generally and, in particular, petroleum fractions having an initial boiling point of at least 200° C., a 50% point range of at least 260° C. and an end point of at least 320° C. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure.

Suitable Shape Selective Zeolites

The members of the class of zeolites to be thermally treated for use in this invention are characterized by a pore dimension greater than about 5 Angstroms, i.e., the zeolite is capable of sorbing paraffins having a single methyl branch as well as normal paraffins, and it has a silica to alumina mole ratio of at least 12. Zeolite A, for example, with a silica to alumina ratio of 2.0, is not useful in this invention, and moreover it has no pore dimension greater than about 5 Angstroms.

These zeolites exhibit some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have relatively low alumina contents, i.e., high silica to alumina mole ratios, they are very active even with silica to alumina mole ratios of, e.g., 30 to 80. This activity is surprising, since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

The high cracking activity, or alpha activity, of these zeolites is good from the standpoint of high conversions, but the high alpha activity translates, in the FCC process, into excessive cracking of paraffins, and loss of gasoline yield. Thus the shape selective catalyst's ability to promote aromatic formation is overshadowed by its ability to fragment paraffins.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful as starting materials in this invention, possess, in combination: a Constraint Index, as hereinafter defined, of about 1 to 12, a silica to alumina mole ratio of about 10:1 to 100:1, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. In some zeolites, the upper limit of silica to alumina mole ratio is unbounded, with values of 30,000 and greater. Such zeolites may not be good starting materials for the present invention, they already have such low alpha values that little or nothing would be gained by the thermal treatment of the present invention. Suitable starting materials have a 10:1 to 100:1 silica to alumina mole ratios. Preferred starting materials will have silica to alumina mole ratios of about 20:1 to 70:1. These shape selective materials are useful in a variety of processes, such as methanol to gasoline, catalytic dewaxing, etc., and a lot of these materials are made for such uses. It is also inherent that these materials will have a high alpha activity, usually well in excess of 100.

These shape selective zeolites, after activation, acquire an intracrystalline sorption capacity for normal hexane which is greater than that for water, i.e., they exhibit "hydrophobic" properties. It is believed that this hydrophobic character is advantageous in the present invention.

The zeolites used as starting materials in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-member rings are preferred, although excessive puckering or pore blockage may render these zeolites substantially ineffective. Zeolites with windows of 12-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constraint access, a simple determination of the "Constraint Index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those which employ a zeolite having a constraint index from 1.0 to 12.0. Constraint Index (C.I.) values for some typical zeolites, including some not within the scope of this invention, are:

| Zeolite | C.I. |
| --- | --- |
| Erionite | 38 |
| ZSM-5 | 8.3 |
| ZSM-11 | 8.7 |
| ZSM-35 | 6.0 |
| TMA Offretite | 3.7 |
| ZSM-38 | 2.0 |
| ZSM-12 | 2 |
| ZSM-4 | 0.5 |
| Acid Mordenite | 0.5 |
| REY | 0.4 |
| Amorphous Silica-Alumina | 0.6 |
| ZSM-23 | 9.1 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above-defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a constraint index of 1 to 12 is intended to be included in the instant catalyst definition regardless that the same identical zeolite tested under other defined conditions may give a constraint index value outside of 1 to 12.

A useful measure of the acid activity of a material is the alpha activity or alpha value. The alpha value reflects the relative activity of the catalyst with respect to a high activity silica-alumina cracking catalyst. To determine the alpha value as such term is used herein, n-hexane conversion is determined at about 800° F. Conversion is varied by variation in space velocity such that a conversion level of 10 to 60 percent of n-hexane is obtained and converted to a rate constant per unit volume of zeolite and compared with that of silica-alumina catalyst which is normalized to a reference activity of 1000° F. Catalytic activity of the catalysts are expressed as multiple of this standard, i.e., the silica-alumina standard. The silica-alumina reference catalyst contains about 10 weight percent $Al_2O_3$ and the remainder $SiO_2$. This method of determining alpha, modified as described above, is more fully described in the Journal of Catalysis, Vol. VI, pages 278–287, 1966.

The porotectosilicates utilized as promoters herein constitute an unusual class of natural and synthetic materials. They are characterized by having a rigid crystalline framework structure composed generally of an assembly of atoms other than those of oxygen, each surrounded by a tetrahedron of shared oxygen atoms, and a precisely defined pore structure. Two of the crystalline porous tectosilicates which may be used are ZSM-5 and ZSM-11, which have in common some characteristic X-ray diffraction pattern lines. Four strong lines common to ZSM-5 and ZSM-11 are set forth in Table 1 below:

TABLE 1

| Interplanar Spacing d (A) |
|---|
| 11.1 ± 0.3 |
| 10.0 ± 0.2 |
| 3.85 ± 0.07 |
| 3.71 ± 0.5 |

These values were determined by standard techniques. The radiation was the K-alpha doublet of copper, and a scintillation counter spectrometer with a strip chart pen recorder was used. The peak heights, I, and the positions as a function of 2 times theta, where theta as the Bragg angle were read from the spectrometer chart. From these, the relative intensities, 100 I/Io where Io is the intensity of the strongest line or peak and d(obs.), the interplanar spacing in A, corresponding to the recorded lines, were calculated.

The members of the class of zeolites defined herein of the catalyst are exemplified by ZSM-5, ZSM-11, ZSM-12, ZSM-23, ZSM-35, ZSM-38 and other similar materials. U.S. Pat. No. 3,702,886 describing and claiming ZSM-5 is incorporated herein by reference. Also, Re. No. 29,948 describing and claiming a crystalline material with an X-ray diffraction pattern of ZSM-5, is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is described in U.S. Pat. No. 4,377,497, the entire contents of which, and particularly, the X-ray diffraction pattern of said ZSM-48, are incorporated herein by reference.

Natural zeolites may sometimes be converted to this class of zeolites by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred zeolites of the catalyst are ZSM-5, ZSM-11, ZSM-12, ZSM-23, ZSM-35 and ZSM-38, with ZSM-5 and ZSM-11 particularly preferred.

The zeolites used in this invention may be in the hydrogen form or they may be base exchanged or impregnated to contain a rare earth cation complement. Such rare earth cations comprise Sm, Nd, Pr, Ce and La. It is desirable to calcine the zeolite after base exchange.

In a preferred aspect of this invention, the zeolites comprising the catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising a zeolite having a constraint index as defined above of about 1 to 12, a silica to alumina mole ratio of about 10:1 to 100:1 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on *Zeolite Structure* by W. M. Meier. This paper is included in *Proceedings of the Conference on Molecular Sieves*, London, April 1967, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The catalysts of this invention may be in a matrix, used alone or mixed with other conventional catalysts. The particle size of the individual component particles may be quite small, for example from about 20 to about 150 microns, when intended for use in fluid bed operation, or they may be as large as up to about 1 cm for fixed bed operation. Or the components may be mixed as powders and formed into pellets or extrudate, each pellet containing both components in substantially the required proportions.

In one embodiment, the thermally treated zeolite, e.g., ZSM-5, and a conventional cracking catalyst, e.g., RENaY, are mixed together in a common clay or amorphous silica/alumina binder and spray dried, pelleted, pilled to the desired size and shape.

As is the case of many catalysts, it is desirable to incorporate the zeolite component in a matrix. Such matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, zeolite materials have been incorporated into naturally occurring clays, e.g. bentonite and kaolin.

In additiion to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

Conventional cracking catalysts contain active components which may be zeolitic or non-zeolitic. The non-zeolitic active components are generally amorphous silica-alumina and crystalline silica-alumina. However, the major conventional cracking catalysts presently in use generally comprise a crystalline zeolite (active component) in a suitable matrix. Representative crystalline zeolite active component constituents of conventional cracking catalysts include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being zeolite Y, more preferable a rare earth exchanged Y, or an ultrastable Y zeolite.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural clays, synthetic clays, or chemically treated clays such as kaolin type clays, montmorillonite, bentonite or halloysite. These clays may be used either alone or in combination with silica or any of the above specified cogels in matrix formulation.

Where a matrix is used, content of crystalline zeolite, i.e. the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

Thermal Treatment

In the present invention, it is not necessary to either make shape selective zeolites with very high silica/alumina ratios, nor to use conventional aluminum extraction techniques on shape selective zeolites having relatively high aluminum contents. In the present invention, a relatively simple thermal treatment profoundly transforms the catalytic activity of ZSM-5 and other shape selective zeolites with silica/alumina ratios of 10:1 to about 100:1. After the controlled thermal treatment disclosed herein, these shape selective materials behave, catalytically, as if they had much higher silica/alumina ratios, while still retaining a significant amount of acid activity.

There is nothing magical about a certain time or temperature or gas used in thermal treatment, although a steam containing atmosphere is preferred. The art has long recognized that steaming has a deactivating effect on FCC catalysts in general, and has used this deactivating effect to avoid undesirable hyperactivity when starting up a unit containing fresh catalyst.

The prior workers in this field realized the benefits of controlled thermal treatment. We use a thermal treatment which is relatively severe, to profoundly change the catalytic characteristics of the shape selective material.

The broad general parameters of steaming to deactivate catalyst are well known in the art. What is not known is to continue steaming the shape selective catalyst, with a relatively high aluminum content, until a catalyst with an alpha activity of 1 to 10 is obtained, and use of this catalyst in a cracking process.

In general, thermal treatments conditions include temperatures of 250° to 1000° C., and preferably 500° to 800° C., pressures of subatmospheric to superatmospheric, although operation at atmospheric pressure gives good results. Thermal treatment time will depend on temperature and presence of steam. Higher temperatures and steam will shorten treatment time required. Treatment times, of 0.01 to 1,000 hours, preferably 0.1 to 100 hours, are satisfactory. The treatment may be conducted in either fixed bed, fluid bed, or moving bed operation, with fluid bed steaming being preferred. The fluid bed treatment eliminates dead spots and channeling within the catalyst bed and the presence of steam reduces the temperature required for reduction of the alpha value.

Operation with pure steam, or steam mixed with inert gases or with air or other gases gives acceptable results. Operation with pure steam, or steam mixed with air, is preferred. Small amounts of reacting gasses could also be beneficial, such as acidic gases, Cl, F, HCl, organo halogens, etc.

Steaming should be conducted until the cracking activity, or alpha activity or value as measured by the alpha test is reduced to about 1 to 10.

When starting with a ZSM-5 material with a silica/alumina ratio of 70:1, the alpha activity of the virgin material is about 200. Steaming this material for 8 hours at 690° C. temperature in a fluidized bed, fluidized by a live steam, should reduce the alpha activity to about one.

A ZSM-5 material with a silica:alumina mole ratio of about 35:1 will have a virgin alpha value of 750. Steaming of this material in a fluidized bed of live steam for 6 hours at 600° C. should give an alpha value of about 10.

A similar procedure is used when steaming other shape selective materials, such as ZSM-11, or any other shape selective material with a constraint index of about 1 to 12 and a silica to alumina mole ratio of about 10:1 to 100:1.

Although we are not positive why thermal treatment, preferably steaming, brings about such a profound change in the catalyst activity, we believe that the effect of steaming is to change the distribution of aluminum atoms within the zeolite framework. We are confident that the aluminum is not volatilized by the treatment, it is not removed as a vapor, nor does it plate out on the walls of the vessel used to contain the catalyst during thermal treatment. An elemental analysis of the shape selective additive both before and after steaming would show essentially the same aluminum content. The aluminum is still in the shape selective material, though probably not occupying some of its original positions in the framework of the zeolite. Because the thermally treated shape selective material of the present invention exhibits catalytic behavior similar to that of shape selective material made with very low aluminum contents, it is possible that steaming simply displaces aluminum atoms to some non functional portion of the zeolite framework, so that the resulting skeletal structure is aluminum deficient. It is also possible that some much more complex, or entirely different, phenomenon is happening within the zeolite to account for the profound change in catalytic activity which is observed.

EXAMPLES

Example 1—Prior Art

The following example was not actually run in our laboratories. This example is copied from U.S. Pat. No. 4,340,465 to show that simple steaming of a ZSM-5 with a 39:1 $SiO_2:Al_2O_3$ mole ratio did not make it behave like a ZSM-5 material with a 2200:1 $SiO_2:Al_2O_3$ ratio given a similar steam treatment.

TABLE 1

Pulse Decane Cracking Over ZSM-5 Type Catalyst Component at 510° C. (Sieve Steamed 6 Hrs. at 760° C.)

| | | | | |
|---|---|---|---|---|
| Sieve Al, % | 0.04 | 0.45 | 2.3 | 2.3 |
| $SiO_2/Al_2O_3$ | 2200 | 200 | 39 | 39 |
| Conversion, Wt. % | 7 | 12 | 34 | 12 |
| Selectivity | | | | |
| $C_2$-$C_3$ | 28 | 35 | 42 | 39 |
| $C_4$ | 28 | 33 | 29 | 31 |
| $C_5$-$C_9$ | 44 | 32 | 29 | 30 |
| Aromatics Contents in $C_5$-$C_9$, wt. % | 30 | 24 | 18 | 14 |

TABLE 2

Pulse Decane Cracking Over ZSM-5 Type Catalyst Component at 482° C. (Sieve Steamed 6 Hrs. at 760° C.)

| | | | | |
|---|---|---|---|---|
| Sieve Al, % | 0.04 | 0.45 | 2.3 | 2.3 |
| $SiO_2/Al_2O_3$ | 2200 | 200 | 39 | 39 |
| Conversion, Wt. % | 6 | 7 | 21 | 7 |
| Selectivity | | | | |
| $C_2$-$C_3$ | 0 | 39 | 40 | 39 |
| $C_4$ | 65 | 32 | 36 | 31 |

TABLE 2-continued

Pulse Decane Cracking Over ZSM-5 Type Catalyst Component at 482° C. (Sieve Steamed 6 Hrs. at 760° C.)

| | | | | |
|---|---|---|---|---|
| $C_5-C_9$ | 35 | 29 | 24 | 30 |
| Aromatics Contents in $C_5-C_9$, wt. % | 29 | 23 | 15 | 12 |

These catalysts were severely steamed, resulting in significant catalyst deactivation. We estimated that these catalysts would have the following alpha activity after steaming for 6 hours at 760° C.

| $SiO_2/Al_2O_3$ | Alpha Activity |
|---|---|
| 2200 | 0.4 |
| 200 | 0.5 |
| 39 | 0.5 |
| 39 | 0.5 |

Example 2—Prior Art

Example 2 shows the effect of mixing conventional ZSM-5 material, with varying silica to alumina mole ratios in with a conventional FCC catalyst in a conventional FCC process.

All the additive catalysts used in this study were prepared in fluid particle size by dispersing the ZSM-5 shape selective component, in a freshly prepared silica-alumina-clay matrix or a conventional processed silica alumina matrix, followed by spray drying. The ZSM-5 level in the additive was 25% by weight. The freshly prepared silica-alumina-clay matrix required a base exchange in conventional manner with solutions of $(NH_4)_2SO_4$ followed by $RECl_3$. The resulting fluid particles, containing the octane promoting ZSM-5, were added to a Filtrol FS30, cracking catalyst, steamed 4 hours at 1400° F. In most cases 0.25 wt % ZSM-5 based upon total cracking catalyst was used.

The alpha activity data reported were obtained at 1000° F. for the additive, the alpha activity was determined using particles which contained the 25 wt % ZSM-5 component.

The catalytic cracking data summarized in Table 4 were obtained in a bench scale fluidized bed unit with the steamed Filtrol FS30 catalyst as the base. To this base was added the various promoting fluid catalyst particles containing the ZSM-5 octane promoter. These combination catalysts were evaluated with the Joliet Sour Heavy Gas Oil (JSHGO) or with a hydrotreated Arab Light Resid (HDT ALR) as described in Tables 1 and 2. Properties of these feeds are presented in Table 3.

TABLE 3

Chargestock Properties

| Properties | Joliet Sour, Heavy Gas Oil | HDT 650° F.+ Arab Light Atmospheric Resid |
|---|---|---|
| Ni, ppm | — | 0.8 |
| V, ppm | — | 0.6 |
| Gravity, °API | 24.3 | 22.2 |
| Sulfur, % Wt | 1.87 | 0.38 |
| Nitrogen, % Wt | 0.03 | 0.08 |
| Basic Nitrogen, PPM | 327 | 311 |
| CCR, % Wt | 0.29 | 3.46 |
| Aniline Point, °F. | 171 | 205.1 |
| KV @ 210° F., cs | 3.62 | 13.04 |
| Bromine No. | 4.2 | 1.6 |
| Hydrogen, % Wt | 12.3 | 12.50 |
| Refractive Index @ 70° C. | 1.50801 | 1.49101 |
| Molecular Weight | 358 | 453 |
| Distillation, °F. (D-1160) | | |
| IBP | 414 | 620 |
| 5% vol | 548 | 668 |
| 10% | 614 | 716 |
| 20% | 667 | 754 |
| 30% | 701 | 792 |
| 40% | 733 | 829 |
| 50% | 767 | 869 |
| 60% | 801 | 922 |
| 70% | 839 | 980 |
| 80% | 877 | — |
| 90% | 924 | — |
| 95% | 956 | — |
| Composition, % Wt | | |
| Paraffins % Wt | 23.5 | 23.9 |
| Naphthenes, % Wt | 32.0 | 26.1 |
| Aromatics, % Wt | 44.5 | 50.0 |
| $C_a$, (ndm) | 18.9 | 17.4 |

TABLE 4

(Prior Art)
Octane Yield Promotion of Steamed Filtrol FS30 Calcined Additive

| | Wt % ZSM-5 Added | Alpha Activity | Catalyst No. | Run No. | Charge | Conv. Vol % | $C_5+$ Gaso. Vol % |
|---|---|---|---|---|---|---|---|
| ZSM-5 Catalyst Type | | | | | | | |
| Low Na ZSM-5 2.4% $Al_2O_3$; $SiO_2/Al_2O_3 \sim 70/1$ Matrix: $SiO_2$—$Al_2O_3$—Clay | 0.25 | 53 | 11344 | 2743[1] | JSHGO | 74.2 | 57.5 |
| | | | 11345 | 2756 | JSHGO | 73.7 | 59.6 |
| | | | 11345-2 | 2779[2] | HDTALR | 76.8 | 58.5 |
| HZSM-5 2.4% $Al_2O_3$, $SiO_2/Al_2O_3 \sim 70/1$ Matrix: $SiO_2$—$Al_2O_3$ | 0.25 | 45 | 11348 | 2745 | JSHGO | 73.2 | 56.6 |
| | | | 11349 | 2758 | JSHGO | 74.1 | 58.1 |
| HZSM-5 0.11% $Al_2O_3$; $SiO_2/Al_2O_3 \sim 1500/1$ Matrix: $SiO_2$—$Al_2O_3$ | 0.25 | 3 | 11366 | 2813 | JSHGO | 71.1 | 57.0 |
| | | | 11366 | 2783[2] | HDTALR | 78.2 | 65.3 |
| | 1.0 | | 11368 | 2814 | JSHGO | 73.3 | 57.6 |
| | | | 11368 | 2785[2] | HDTALR | 78.8 | 62.2 |
| HZSM-5 15 ppm $Al_2O_3$; $SiO_2/Al_2O_3 \sim 100,000/1$ Matrix: $SiO_2$—$Al_2O_3$—Clay | 0.25 | 1 | 11346 | 2744 | JSHGO | 74.3 | 63.0 |
| | | | 11347 | 2757 | JSHGO | 74.9 | 63.0 |
| | | | 11347 | 2769 | JSHGO | 74.4 | 63.6 |
| | | | 11347-2 | 2780[2] | HDTALR | 78.4 | 66.2 |
| | 1.0 | | 11364 | 2775 | JSHGO | 74.8 | 63.7 |

TABLE 4-continued
(Prior Art)
Octane Yield Promotion of Steamed Filtrol FS30
Calcined Additive

|  |  |  | 11364 | 2784[2] | HDTALR | 78.3 | 64.9 |
|---|---|---|---|---|---|---|---|
| HZSM-5 | 0.25 |  | 11352 | 2746 | JSHGO | 74.2 | 63.3 |
| 15 ppm Al$_2$O$_3$; |  |  | 11353 | 2753 | JSHGO | 75.5 | 61.2 |
| SiO$_2$/Al$_2$O$_3$ |  |  |  |  |  |  |  |
| ≈100,000/1 |  |  |  |  |  |  |  |
| Matrix: SiO$_2$—Al$_2$O$_3$ |  |  |  |  |  |  |  |
| NaZSM-5 ion exchanged[3] | 0.25 | 24 | 11354 | 2755 | JSHGO | 72.2 | 55.8 |
| 2.4% Al$_2$O$_3$, |  |  | 11354 | 2766 | JSHGO | 72.5 | 59.0 |
| SiO$_2$/Al$_2$O$_3$~70/1 |  |  | 11355 | 2759 | JSHGO | 74.1 | 55.1 |
| Matrix: SiO$_2$—Al$_2$O$_3$—Clay |  |  | 11355-2 | 2781[2] | HDTALR | 78.3 | 57.7 |
| Above Product + |  |  | 11367 | 2782[2] | HDTALR | 78.2 | 64.1 |
| NaCO$_3$ exchanged |  |  |  |  |  |  |  |
| NaZSM-5 as synthesized |  | 32 | 11358 | 2752 | JSHGO | 75.1 | 58.1 |
| 2.4% Al$_2$O$_3$, |  |  |  |  |  |  |  |
| SiO$_2$/Al$_2$O$_3$~70/1 |  |  |  |  |  |  |  |
| Matrix: SiO$_2$—Al$_2$O$_3$ |  |  |  |  |  |  |  |
| Base Catalyst Filtrol |  | 11343SF4 |  | 2742[1] | JSHGO | 74.9 | 63.1 |
| FS30 Stmd. 4 hrs @ 1400° F. |  | " |  | 2778[2] | HDTALR | 76.9 | 66.1 |

|  | Total C$_4$s Vol % | Dry Gas Wt % | Coke Wt % | O.N. R+O | ΔC$_5$+ | ΔO.N. | ΔC$_5$+/ΔO.N. |
|---|---|---|---|---|---|---|---|
| ZSM-5 Catalyst Type |  |  |  |  |  |  |  |
| Low Na ZSM-5 | 23.5 | 6.0 | 3.95 | 90.9 | −5.6 | +2.9 | −1.9 |
| 2.4% Al$_2$O$_3$; | 21.2 | 5.1 | 4.02 | 89.5 | −3.5 | +1.5 | −2.3 |
| SiO$_2$/Al$_2$O$_3$~70/1 | 24.2 | 5.8 | 6.24 | 89.2 | −7.6 | +2.2 | −3.5 |
| Matrix: SiO$_2$—Al$_2$O$_3$—Clay |  |  |  |  |  |  |  |
| HZSM-5 | 23.4 | 5.7 | 4.01 | 90.2 | −6.5 | +2.2 | −3.0 |
| 2.4% Al$_2$O$_3$, |  |  |  |  |  |  |  |
| SiO$_2$/Al$_2$O$_3$~70/1 | 24.0 | 5.1 | 4.15 | 90.4 | −5.0 | +2.4 | −2.1 |
| Matrix: SiO$_2$—Al$_2$O$_3$ |  |  |  |  |  |  |  |
| HZSM-5 | 15.3 | 7.4 | 3.87 | 88.5 | −2.9 | −0.2 | −3.1 |
| 0.11% Al$_2$O$_3$; | 17.5 | 5.4 | 6.22 | 88.1 | −0.8 | +1.1 | −0.7 |
| SiO$_2$/Al$_2$O$_3$~1500/1 |  |  |  |  |  |  |  |
| Matrix: SiO$_2$—Al$_2$O$_3$ |  |  |  |  |  |  |  |
|  | 17.2 | 7.4 | 3.99 | 90.3 | −2.3 | +1.6 | −1.4 |
|  | 21.0 | 6.0 | 6.32 | 89.0 | −3.9 | +2.0 | −2.0 |
| HZSM-5 | 16.7 | 5.8 | 3.8 | 89.0 | −0.1 | +1.0 | 0 |
| 15 ppm Al$_2$O$_3$; | 18.1 | 5.4 | 3.94 | 90.6 | −0.1 | +2.6 | 0 |
| SiO$_2$/Al$_2$O$_3$ | 16.8 | 5.6 | 3.78 | 89.3 | +0.5 | +1.3 | +0.4 |
| ~100,000/1 |  |  |  |  |  |  |  |
| Matrix: SiO$_2$—Al$_2$O$_3$—Clay | 18.9 | 4.3 | 6.18 | 86.6 | +0.1 | −0.4 | +4.0 |
|  | 17.3 | 5.4 | 3.86 | 89.7 |  | +1.7 | +0.4 |
|  | 17.8 | 5.5 | 6.53 | 87.5 | −2.2 | +0.5 | −4.4 |
| HZSM-5 | 19.1 | 3.7 | 3.89 | 89.0 | +0.2 | +1.0 | +0.2 |
| 15 ppm Al$_2$O$_3$; | 18.1 | 6.8 | 3.94 | 89.4 | −1.9 | +1.4 | −1.4 |
| SiO$_2$/Al$_2$O$_3$ |  |  |  |  |  |  |  |
| ≈100,000/1 |  |  |  |  |  |  |  |
| Matrix: SiO$_2$—Al$_2$O$_3$ |  |  |  |  |  |  |  |
| NaXSM-5 ion exchanged[3] | 17.2 | 8.8 | 4.05 | 90.1 | −7.3 | +2.1 | −3.5 |
| 2.4% Al$_2$O$_3$, | 19.2 | 5.8 | 3.76 | 90.4 | −4.1 | +2.4 | −1.7 |
| SiO$_2$/Al$_2$O$_3$~70/1 | 23.6 | 7.3 | 4.73 | 91.0 | −8.0 | +3.0 | −2.7 |
| Matrix: SiO$_2$—Al$_2$O$_3$—Clay | 25.7 | 6.5 | 6.4 | 90.5 | −8.4 | +3.5 | −2.4 |
| Above Product + | 19.9 | 5.0 | 6.32 | 88.3 | −2.0 | +1.3 | −1.5 |
| NaCO$_3$ exchanged |  |  |  |  |  |  |  |
| NaZSM-5 as synthesized | 24.6 | 5.6 | 4.0 | 90.6 | −5.0 | +2.8 | −1.8 |
| 2.4% Al$_2$O$_3$, |  |  |  |  |  |  |  |
| SiO$_2$/Al$_2$O$_3$~70/1 |  |  |  |  |  |  |  |
| Matrix: SiO$_2$—Al$_2$O$_3$ |  |  |  |  |  |  |  |
| Base Catalyst Filtrol | 17.0 | 5.9 | 3.8 | 88 |  |  |  |
| FS30 Stmd. 4 hrs @ 1400° F. | 16.3 | 4.7 | 5.74 | 87 |  |  |  |

[1]960° F., WHSV~12.5, ~2 C/O,
[2]960° F., WHSV~16, ~1.5 C/O
[3]ion exchanged with NH$_4^+$ ion.

Example 3—Present Invention

This example shows that catalytically, steamed ZSM-5 with a silica:alumina ratio of about 70 acts as if it had a relatively high silica:alumina mole ratio, after steaming to reduce its alpha activity to 0.6 to 3. The same test apparatus, and feedstock used in Example 2 was used for Example 3. Results are reported in Table 5.

TABLE 5
(Invention)
Octane Yield Promotion of Steamed Filtrol FS30
Additive Steamed 4 Hrs at 1300° F.

| Wt % ZSM-5 | Alpha | Catalyst | Run | Conv. | C$_5$+ Gaso. |
|---|---|---|---|---|---|

TABLE 5-continued (Invention)
Octane Yield Promotion of Steamed Filtrol FS30
Additive Steamed 4 Hrs at 1300° F.

|  | Added | Activity | No. | No. | Charge | Vol % | Vol % |
|---|---|---|---|---|---|---|---|
| Type ZSM-5 | | | | | | | |
| Low Na ZSM-5, | 1.0 | 1.5 | 11350 | 2760[1] | JSHGO | 74.0 | 60.6 |
| 2.4% $Al_2O_3$, | | | | | | | |
| $SiO_2/Al_2O_3 \sim 70/1$ | | | 11350 | 2771[1] | JSHGO | 74.7 | 63.4 |
| Matrix: $SiO_2$—$Al_2O_3$—Clay | | | 11350 | 2792[2] | HDTALR | 74.3 | 63.7 |
| HZSM-5 | 1.0 | 3 | 11351 | 2761[1] | JSHGO | 75.3 | 61.0 |
| 2.4% $Al_2O_3$, | | | | | | | |
| $SiO_2/Al_2O_3 \sim 70/1$ | | | | 2772[1] | JSHGO | 73.8 | 62.0 |
| Matrix: $SiO_2$—$Al_2O_3$ | | | | | | | |
| NaZSM-5[3] | 1.0 | 0.6 | 11362 | 2767[1] | JSHGO | 75.4 | 62.8 |
| 2.4% $Al_2O_3$; | | | | | | | |
| $SiO_2/Al_2O_3 \sim 70/1$ | | | | | | | |
| Matrix: $SiO_2$—$Al_2O_3$—Clay | | | 11362 | 2794 | HDTALR | 75.3 | 64.9 |
| NaZSM-5 As Synthesized | 1.0 | 3 | 11363 | 2768[1] | JSHGO | 73.0 | 61.0 |
| 2.4% $Al_2O_3$; | | | | | | | |
| $SiO_2/Al_2O_3 \sim 70/1$ | | | | | | | |
| Matrix: $SiO_2$—$Al_2O_3$ | | | | | | | |
| Base Catalyst Filtrol | | | 11343SF4 | 2742 | JSHGO | 74.9 | 63.1 |
| FS30 Steamed 4 Hrs @ 1400° F. | | | 11343SF4 | 2787 | HDTALR | 70.8 | 66.5 |

|  | Total $C_4$s Vol % | Dry Gas Wt % | Coke Wt % | O.N. R+O | $\Delta C_5+$ | $\Delta$O.N. | $\dfrac{\Delta C_5+}{\Delta \text{O.N.}}$ |
|---|---|---|---|---|---|---|---|
| Type ZSM-5 | | | | | | | |
| Low Na ZSM-5, | 17.9 | 6.1 | 4.12 | 89.8 | −2.5 | +1.8 | −1.4 |
| 2.4% $Al_2O_3$, | | | | | | | |
| $SiO_2/Al_2O_3 \sim 70/1$ | 17.2 | 5.0 | 4.04 | 89.0 | +0.3 | +1.0 | +0.3 |
| Matrix: $SiO_2$—$Al_2O_3$—Clay | 16.8 | 4.8 | 5.01 | 87.2 | −2.8 | +1.8 | −1.6 |
| HZSM-5 | 18.9 | 6.2 | 4.47 | 90.5 | −1.9 | +2.5 | −0.8 |
| 2.4% $Al_2O_3$, | | | | | | | |
| $SiO_2/Al_2O_3 \sim 70/1$ | 16.9 | 5.6 | 4.2 | 89.1 | −1.1 | +1.1 | −1.0 |
| Matrix: $SiO_2$—$Al_2O_3$ | | | | | | | |
| NaZSM-5[3] | 19.5 | 5.1 | 3.97 | 90.3 | −0.3 | +2.3 | −0.1 |
| 2.4% $Al_2O_3$; | | | | | | | |
| $SiO_2/Al_2O_3 \sim 70/1$ | | | | | | | |
| Matrix: $SiO_2$—$Al_2O_3$—Clay | 16.3 | 4.7 | 5.16 | 87.1 | −1.6 | +1.7 | −0.9 |
| NaZSM-5 As Synthesized | 19.5 | 4.7 | 3.83 | 90.6 | −1.9 | +2.6 | −0.7 |
| 2.4% $Al_2O_3$; | | | | | | | |
| $SiO_2/Al_2O_3 \sim 70/1$ | | | | | | | |
| Matrix: $SiO_2$—$Al_2O_3$ | | | | | | | |
| Base Catalyst Filtrol | 17.0 | 5.9 | 3.8 | 88.0 | | | |
| FS30 Steamed 4 Hrs @ 1400° F. | 16.9 | 3.9 | 5.16 | 85.4 | | | |

[1] Evaluation at 960° F., WHSV ~12.5, ~2 C/O
[2] Evaluation at 960° F., WHSV ~16, ~1.5 C/O
[3] ion exchanged with 1N NaCl/0.05M $Na_2B_4O_7$ solution, calcined 3 hrs 1000° F.

Using the process of the present invention, it is possible to take ZSM-5, with relatively low silica:alumina mole ratio, subject this to a controlled thermal treatment, and obtain ZSM-5 which behaves as if it had a significantly higher silica to alumina mole ratio. The process results obtained using the steamed catalyst show that use of the steamed catalyst with a $SiO_2$:$Al_2O_3$ ratio of, e.g., 40-90 is about as good as the use of, e.g., 1500:1 silica to alumina ZSM-5. Some data indicate that the steamed material may give slightly higher yields of gasoline than will addition of, e.g., 1500:1 ZSM-5 material.

Even if the results of using the steamed catalyst are deemed to be no better than those achieved using catalyst manufactured to have a very high silica:alumina mole ratio, the present invention provides another way of obtaining these benefits without making a special batch of ZSM-5 catalyst with a high $SiO_2$:$Al_2O_3$ ratio, or subjecting the conventional material to an aluminum extraction step. It is also possible to simplify manufacturing and inventory procedures, whereby ZSM-5 with a 70:1 silica to alumina mole ratio, can, after thermal treatment, be made to take the place of ZSM-5 with a 1500:1 silica:alumina mole ratio.

Using the process of this invention, petroleum refiners can add relatively small amounts of thermally treated shape selective catalyst to their conventional FCC units containing conventional catalysts, and obtain an immediate increase in octane number with only a slight, or perhaps no, yield penalty.

The final alpha number of the thermally treated shape selective catalyst which is the subject of the present invention can be determined based on the relative cost of the shape selective material to conventional catalyst, the need for octane, and the aging characteristics of the added shape selective material in that particular unit. In general, higher initial alpha activities are needed to compensate for rapid aging of, e.g., ZSM-5 within the FCC unit. Today we do not know the optimum amount and alpha activity of ZSM-5 to be added, although we suspect that in commercial practice it will be beneficial to operate with an initial alpha activity, on the order of 5 to 10, to compensate for aging of the material in the cracking unit. It is believed that the steam treated ZSM-5 having the alumina redistributed, will be more stable in use and have less activity decline.

What is claimed is:

1. In a process for catalytically cracking a hydrocarbon feed having an initial boiling point of at least 200° C., a 50% point range of at least 260° C. and an end point of at least 320° C. to improve the octane number of the cracked product which comprises the steps of contacting the feed in a reaction zone under catalytic cracking conditions in the absence of added hydrogen with a catalyst comprising a conventional cracking catalyst to produce a cracked hydrocarbon product which is recovered as a product of the process, the improvement comprising adding to said conventional cracking catalyst a thermally treated zeolite having a mole ratio of $SiO_2:Al_2O_3$ of about 10:1 to 100:1 and a constraint index of about 1 to 12, wherein said zeolite has been subjected to thermal treatment at thermal treatment conditions sufficient to reduce its alpha activity to about 1 to 10 prior to use in said process, whereby product yield losses are reduced.

2. The process of claim 1 wherein said ratio of $SiO_2:Al_2O_3$ is about 12:1 to about 80:1.

3. The process of claim 1 wherein said conventional catalyst comprises a large pore size crystalline aluminosilicate cracking component in a matrix.

4. The process of claim 1 wherein catalytic cracking conditions include a temperature of about 400° to 700° C., a pressure of about 0 to 10 atmospheres, a catalyst to hydrocarbon weight ratio of about 1:1 to 20:1, and wherein a residence time of said hydrocarbon in said reaction zone of about 0.1 to 20 seconds.

5. The process of claim 1 wherein said thermal treatment conditions include a temperature of 250° to 1000° C., a pressure of 0 to 10 atmospheres, and a treatment time of 0.01 to 1,000 hours.

6. The process of claim 1 wherein said thermal treatment conditions include the presence of steam with a steam partial pressure of of about one atmosphere at a temperature of 400° to 800° C. for 0.1 to 100 hours.

7. The process of claim 1 wherein said zeolite is selected from the group of ZSM-5 and ZSM-11, with $SiO_2:Al_2O_3$ ratios of about 12:1 to 80:1, and said zeolites have an alpha activity, before treatment, exceeding 100.

8. The process of claim 7 wherein said zeolite is steamed at atmospheric pressure and a temperature of 500° to 800° C., and for a time sufficient to reduce the alpha value to 5 to 10.

9. The process of claim 1 wherein said zeolite and said conventional cracking catalyst are in a common matrix.

10. The process of claim 9 wherein said zeolite is NaZSM-5.

11. The process of claim 10 wherein the silica to alumina mole ratio is about 70:1.

12. The process of claim 1 wherein said zeolite is added as a separate catalyst.

13. The process of claim 1 wherein said thermally treated zeolite comprises 0.025 to 25 wt % of the total amount of conventional cracking catalyst plus said thermally treated zeolite.

14. The process of claim 11 wherein said thermally treated zeolite comprises 1 to 15 wt % of the total amount of catalyst.

15. In a process for catalytically cracking a hydrocarbon having an initial boiling point of a least 200° C., a 50% point range of at least 260° C. and an end point of at least 320° C. in a fluidized catalytic cracking reaction zone using a large pore size crystalline aluminosilicate containing cracking catalyst under catalytic cracking conditions including a total hydrocarbon residence time in said reaction zone of less than about 10 seconds to produce a cracked product, to improve the octane number of the cracked product the improvement comprising adding to said catalyst a thermally treated zeolite component having a mole ratio of $SiO_2:Al_2O_3$ of about 10:1 to about 100:1 and a constraint index of about 1 to 12 wherein said zeolite has been subjected to thermal treatment to reduce its alpha activity to about 1 to 10, whereby product yield losses are reduced.

16. The process of claim 15 wherein the large pore size crystalline aluminosilicate cracking component is Y zeolite.

17. The process of claim 15 wherein the large pore size crystalline aluminosilicate cracking component is an REY zeolite.

18. The process of claim 15 wherein the large pore size crystalline aluminosilicate cracking component is ultrastable Y.

19. The process of claim 15 wherein said thermally treated zeolite comprises from 0.025 to 25 weight percent of the total catalyst inventory in said reaction zone.

20. The process of claim 19 wherein said thermally treated zeolite comprises 1 to 15 wt % of the catalyst inventory.

21. The process of claim 15 wherein said thermally treated zeolite and said large pore aluminosilicate are in a common matrix.

22. The process of claim 15 wherein said thermally treated zeolite is a separate catalyst additive.

23. The process of claim 15 wherein said thermal treatment includes a temperature of 250° to 1000° C., a pressure of 0 to 10 atmospheres, and a treatment time of 0.01 to 1,000 hours.

24. The process of claim 15 wherein said thermal treatment includes the presence of steam at about atmospheric pressure at a temperature of 400° to 800° C. for 0.1 to 100 hours.

25. The process of claim 15 wherein said thermally treated zeolite is selected from the group of ZSM-5 and ZSM-11, with $SiO_2:Al_2O_3$ ratios of about 12:1 to 80:1, and said zeolite has an alpha value, before treatment, exceeding 100.

* * * * *

UNITED STATES PATENT AND TRADEMARK OFFICE
CERTIFICATE OF CORRECTION

PATENT NO. : 4,552,648

DATED : November 12, 1985

INVENTOR(S) : Edward J. Rosinski, Albert B. Schwartz, and Francis G. Dwyer

It is certified that error appears in the above-identified patent and that said Letters Patent is hereby corrected as shown below:

Column 3, line 51, change "Cranking" to --Cracking--.

Column 14, Table 3, line 27, change "1 49101" to --1.49101--.

Claim 6, line 19, delete "of". (2nd occurrence).

Signed and Sealed this

Thirteenth Day of January, 1987

Attest:

DONALD J. QUIGG

Attesting Officer

Commissioner of Patents and Trademarks